United States Patent
Sakanishi

(10) Patent No.: US 10,476,243 B2
(45) Date of Patent: Nov. 12, 2019

(54) COATING REMOVING DEVICE

(71) Applicant: FUJIKURA LTD., Tokyo (JP)

(72) Inventor: Sanga Sakanishi, Chiba (JP)

(73) Assignee: FUJIKURA LTD., Tokyo (JP)

( * ) Notice: Subject to any disclaimer, the term of this patent is extended or adjusted under 35 U.S.C. 154(b) by 149 days.

(21) Appl. No.: 15/541,748

(22) PCT Filed: Mar. 15, 2017

(86) PCT No.: PCT/JP2017/010489
§ 371 (c)(1),
(2) Date: Jul. 6, 2017

(87) PCT Pub. No.: WO2018/163439
PCT Pub. Date: Sep. 13, 2018

(65) Prior Publication Data
US 2018/0272550 A1  Sep. 27, 2018

(30) Foreign Application Priority Data
Mar. 10, 2017  (JP) .................. 2017-045735

(51) Int. Cl.
H02G 1/12 (2006.01)
H01B 7/38 (2006.01)
B26D 7/10 (2006.01)

(52) U.S. Cl.
CPC ............ H02G 1/1209 (2013.01); H01B 7/38 (2013.01); H02G 1/1253 (2013.01); B26D 7/10 (2013.01)

(58) Field of Classification Search
CPC ...... H02G 1/1209; H02G 1/1253; H01B 7/38; G02B 6/245

USPC ......................................... 30/90.1
See application file for complete search history.

(56) References Cited

U.S. PATENT DOCUMENTS

| 5,295,421 A * | 3/1994 | Mansfield ............. G02B 6/245 30/90.1 |
| 5,492,413 A * | 2/1996 | Tsukada ............. F16C 29/0647 384/15 |
| 6,052,880 A | 4/2000 | Basavanhally |

(Continued)

FOREIGN PATENT DOCUMENTS

| CA | 2162194 A1 | 5/1996 |
| CN | 103990718 A * | 8/2014 |

(Continued)

OTHER PUBLICATIONS

English Translation JP2002155926. (Year: 2002).*
Japanese Office Action issued in corresponding application No. 2017-045735 dated May 18, 2017 (3 pages).

*Primary Examiner* — Jennifer B Swinney
(74) *Attorney, Agent, or Firm* — Osha Liang LLP

(57) ABSTRACT

A coating removing device includes a main body that includes a blade used for coating removal; a gripping section that grips an optical fiber; and a slider that connects the main body and the gripping section together so as to be able to approach or separate from each other. The coating removing device removes a coating from the optical fiber by separating the main body and the gripping section after an incision has been made in the coating of the optical fiber using the blade. The slider includes a retention unit to retain the main body and the gripping section in a maximum separation state.

6 Claims, 7 Drawing Sheets

(56) References Cited

U.S. PATENT DOCUMENTS

| | | | |
|---|---|---|---|
| 6,190,046 B1 * | 2/2001 | Agari | F16C 29/0609 384/13 |
| 6,477,310 B1 * | 11/2002 | Dumitriu | G02B 6/245 385/147 |
| 6,598,497 B1 | 7/2003 | Mizushima et al. | |
| 2007/0265177 A1 * | 11/2007 | Michioka | C10M 169/06 508/391 |

FOREIGN PATENT DOCUMENTS

| | | | | |
|---|---|---|---|---|
| CN | 206892390 U | 1/2018 | | |
| EP | 0710858 A1 | 5/1996 | | |
| GB | 2295495 A | * | 5/1996 | G02B 6/245 |
| GB | 2295495 A | 5/1996 | | |
| JP | H01-090003 U | 6/1989 | | |
| JP | H04-112203 U | 9/1992 | | |
| JP | H06-085519 A | 3/1994 | | |
| JP | H06-54303 U | 7/1994 | | |
| JP | H06-076904 U | 10/1994 | | |
| JP | H08-211231 A | 8/1996 | | |
| JP | H09-113733 A | 5/1997 | | |
| JP | 2001-108836 A | 4/2001 | | |
| JP | 2002155926 A | * | 5/2002 | |
| JP | 2002-328241 A | 11/2002 | | |
| JP | 2003-032017 A | 1/2003 | | |
| JP | 2006-154652 A | 6/2006 | | |

* cited by examiner

COATING REMOVING DEVICE

TECHNICAL FIELD

One or more embodiments of the present invention relate to a coating removing device for an optical fiber.

BACKGROUND ART

Known examples of coating removing devices to remove a coating of an optical fiber include devices such as those described in Patent Literature 1 and 2. The coating removing devices described in Patent Literature 1 to 3 heat and soften a coating to be removed from an optical fiber, reduce adhesive force between the bare optical fiber and the coating, and remove the coating. Such coating removing devices include a main body including a pair of blades, and a gripping section that grips the optical fiber. After incisions have been made in the coating of the optical fiber by the pair of blades of the main body, the coating is pulled off with the pair of blades by separating the main body and the gripping section, thereby removing the coating of the optical fiber.

CITATION LIST

Patent Literature

Patent Literature 1: Japanese Unexamined Utility Model Application Publication No. H01-90003
Patent Literature 2: Japanese Unexamined Patent Application Publication No. 2002-328241
Patent Literature 3: Japanese Unexamined Patent Application Publication No. 2001-108836

In order to facilitate removal of a coating of an optical fiber, an improvement is desired in the slideability of a slider that slides a main body and a gripping section, so as to reduce the resistance when separating the main body and the gripping section. However, in cases in which the slideability of the slider has been raised, there is a concern that the main body and gripping section that were separated might approach each other due to rebounding when the coating of the optical fiber is removed by separating the main body and the gripping section. Moreover, when the main body and the gripping section have been separated and the coating of the optical fiber removed, if the coating removing devices is tilted, then there would be a concern that the main body and gripping section that were separated might approach each other under the weight of the main body and the gripping section. If the main body and gripping section that were separated when removing the coating of the optical fiber approach each other in this manner, there would be a concern that the optical fiber whose coating has been removed (bare optical fiber) might get bent between the main body and the gripping section, and that the optical fiber might be damaged.

SUMMARY

One or more embodiments of the present invention suppress the main body and gripping section, which have been separated during coating removal, from approaching each other.

One or more embodiments of the present invention are a coating removing device including: a main body that includes a blade used for coating removal; a gripping section that grips an optical fiber; and a slider that connects the main body and the gripping section together so as to be able to approach or separate from each other. The coating removing device removes a coating from the optical fiber by separating the main body and the gripping section after an incision has been made in the coating of the optical fiber using the blade. The slider includes a retention unit to retain the main body and the gripping section in a maximum separation state.

Other features of one or more embodiments of the present invention are made clear by the Description and Drawings below.

Advantageous Effects

One or more embodiments of the present invention enable the main body and gripping section, which have been separated during coating removal, to be suppressed from approaching each other.

DETAILED DESCRIPTION

Figure 1:
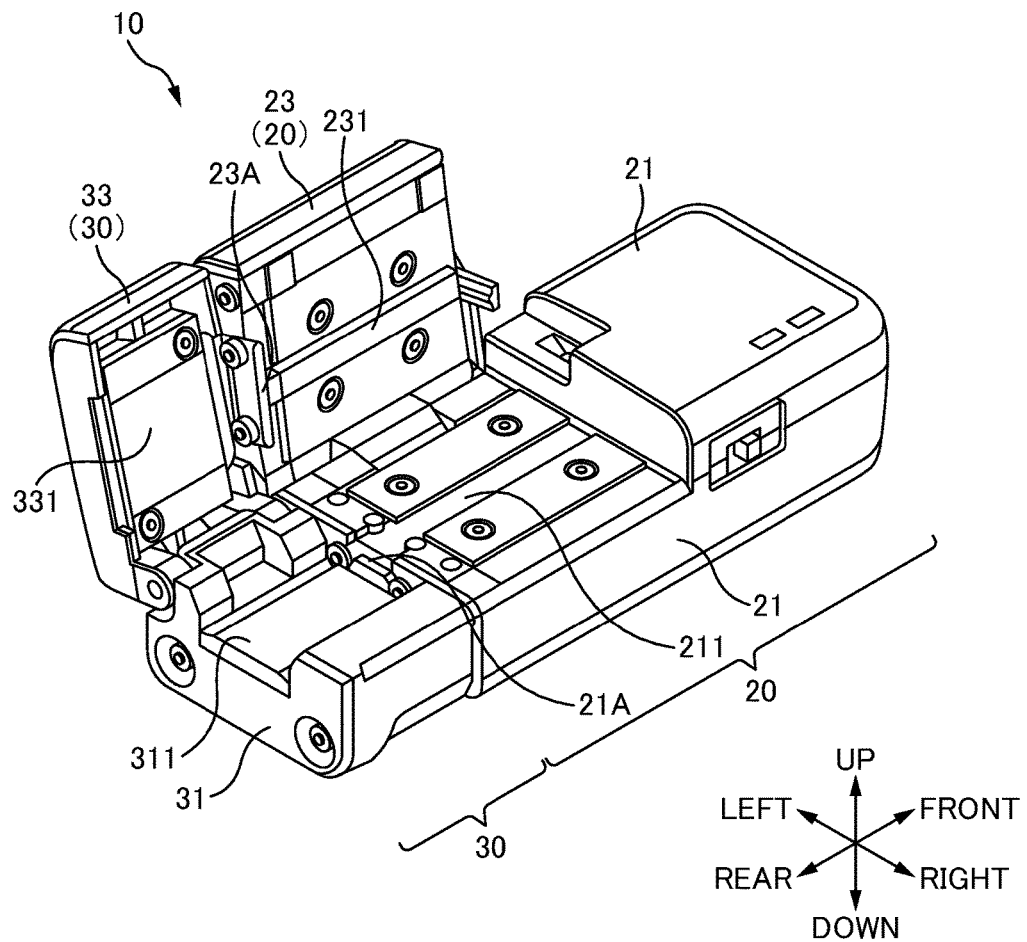
FIG. 1 is an overall perspective view of a coating removing device 10 of an embodiment.

At least the following matters are made clear from the Description and Drawings described below.

Disclosed is a coating removing device including: a main body that includes a blade used for coating removal; a gripping section that grips an optical fiber; and a slider that connects the main body and the gripping section together so as to be able to approach or separate from each other. The coating removing device removes a coating from the optical fiber by separating the main body and the gripping section after an incision has been made in the coating of the optical fiber using the blade. The slider includes a retention unit to retain the main body and the gripping section in a maximum separation state. Such a coating removing device enables the main body and the gripping section that have been separated when removing the coating to be suppressed from approaching each other.

In one or more embodiments, the retention of the maximum separation state by the retention unit is released when force exceeding the weight of the gripping section is applied in a direction to cause the main body and the gripping section to approach each other. The main body and the gripping section that have been separated can accordingly be suppressed from inadvertently approaching each other even supposing the coating removing device were to be tilted.

In one or more embodiments, the slider includes a shaft; an end portion of the shaft is fixed to one of the main body or the gripping section; the other of the main body or the gripping section includes a sliding section in which the shaft can slide; and the retention unit includes a shaft-side engagement portion that is provided to a terminal end portion of the shaft on the opposite side from the shaft's fixed side, and a slide-side engagement portion that is provided to the sliding section, the retention unit retaining the maximum separation state by the shaft-side engagement portion and the slide-side engagement portion engaging with each other. Thus, the main body and the gripping section that have been separated during removal of the coating can be suppressed from approaching each other.

In one or more embodiments, the shaft-side engagement portion includes a taper that becomes thicker toward the terminal end portion; and the slide-side engagement portion is configured by an elastic member and is deformed by the taper.

This thereby facilitates engagement between the shaft-side engagement portion and the slide-side engagement portion due to being able to gradually elastically deform the slide-side engagement portion.

In one or more embodiments, the shaft-side engagement portion includes an indentation; and the slide-side engagement portion includes a protrusion that engages with the indentation. This thereby enables the main body and the gripping section to be retained in the maximum separation state by the protrusion of the slide-side engagement portion catching on the indentation of the shaft-side engagement portion.

In one or more embodiments, the slide-side engagement portion includes a circular cylinder through which the shaft is inserted; the protrusion is a location projecting toward the inside of the circular cylinder; and a thin walled portion is formed at the outside of the circular cylinder at a location where the protrusion is provided. This thereby enables the circular cylinder to readily elastically deform such that the protrusion widens toward the outside, facilitating passage of the taper of the shaft through the inside of the protrusion.

In one or more embodiments, the shaft-side engagement portion includes a taper which becomes thicker toward the terminal end portion, and an indentation provided further toward the terminal end portion than the taper; and the slide-side engagement portion includes a taper housing that houses the taper, and a protrusion that engages with the indentation. The engagement force is strengthened thereby, enabling force retaining the main body and the gripping section in the maximum separation state to be strengthened.

In one or more embodiments, the sliding section includes a ball bearing that slidably supports the shaft. In such cases, it is particularly advantageous for the coating removing device to include a retention unit.

In one or more embodiments, the main body includes a placement section on which to place the optical fiber; and a length of separation between the main body and the gripping section in the maximum separation state is longer than a length of the optical fiber capable of being placed on the placement section. This thereby enables the coating of the optical fiber placed on the placement section to be removed by an operator placing the main body and the gripping section in the maximum separation state.

Figure 2A:
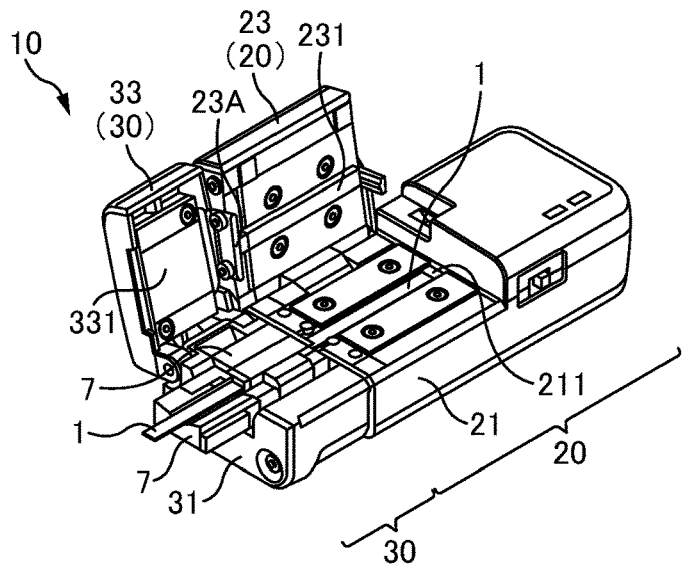
FIG. 2A to FIG. 2C are explanatory diagrams illustrating how coating removal is performed.
Figure 2B:
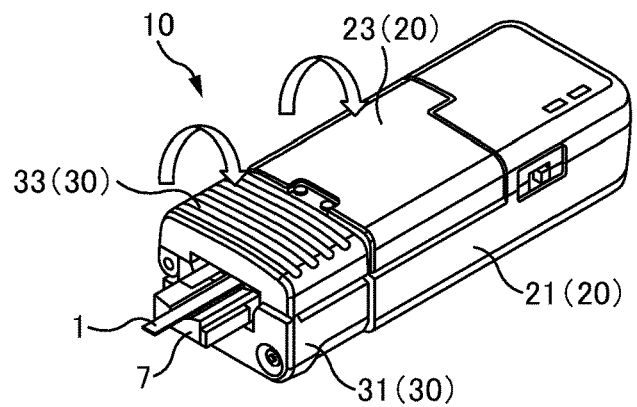
Figure 2C:
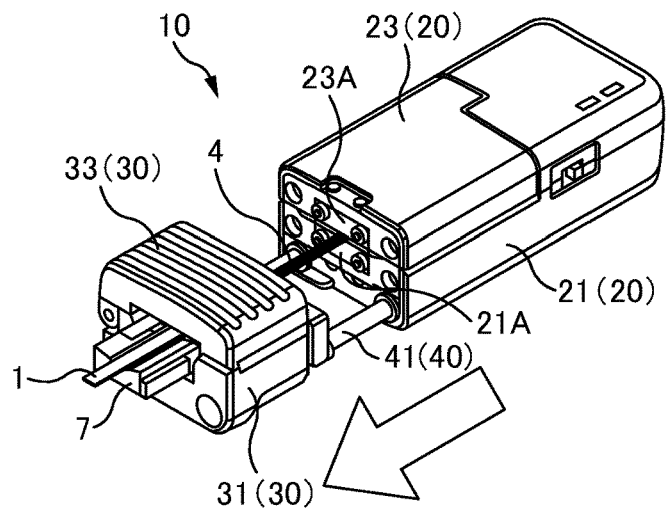

First Embodiment:
<Basic Configuration of Coating Removing Device 10>
FIG. 1 is an overall perspective view of a coating removing device 10 of the present embodiment. FIG. 2A to FIG. 2C are explanatory diagrams of a manner in which coating removal is performed.

The coating removing device 10 is a device that removes a coating from an optical fiber. The target of coating removal in this case is an optical fiber ribbon 1 including a plurality of optical fibers; however, application may be made to a single-core optical fiber. The coating removing device 10 of the present embodiment is a device that heats and softens a coating material (referred to below simply as the coating) that covers an outer periphery of a bare optical fiber 4 (see FIG. 2C), reduces adhesive force between the bare optical fiber 4 and the coating, and removes the coating. The coating removing device 10 of the present embodiment is also referred to as a hot jacket stripper.

In the following explanation, sometimes reference is made to the directions illustrated in FIG. 1. Namely, a movement direction of a main body 20 and a gripping section 30 is taken as a front-to-rear direction, with the side of the main body 20 at the "front" and the side of the gripping section 30 at the "rear". Note that the front-to-rear direction is also sometimes referred to as the "separation direction", the "approach direction", or the "slide direction". A direction perpendicular to a bottom face of a holder housing part 311 of the gripping section 30 is taken as an "up-and-down direction". As viewed from the bottom face of the holder housing part 311, the side where a holder 7 is housed is "up", and the opposite side thereto (the side of a gripping-side body 31) is "down". Moreover, a direction perpendicular to the front-to-rear direction and to the up-and-down direction is taken as a "left-to-right direction". The right side when viewing from the rear side toward the front side is "right", and the left side in this view is "left" (in this case, the hinge sides of lids (a main-body-side lid 23 and a gripping-side lid 33) are on the "left", and the opening and closing sides thereof are on the "right").

The coating removing device 10 includes a main body 20, a gripping section 30, and a slider.

The main body 20 is a member configuring the body of the coating removing device 10. A heat source (heater: not illustrated) to heat the coating is provided in the main body 20. The main body 20 includes a pair of blades 21A, 23A to remove the coating. The main body 20 includes a body section 21 and the main-body-side lid 23. The blades are provided on the body section 21 and the main-body-side lid 23, respectively.

The body section 21 includes the blade 21A and a placement section 211. The blade 21A is a member that makes an incision in the coating, and catches on the coating so as to remove the coating. The placement section 211 is a member on which an end portion of the optical fiber is placed (placement block). The heat source (heater: not illustrated) to heat the coating of the optical fiber is provided in the placement section 211. The placement section 211 is formed in a groove shape along the front-to-rear direction so as to enable placement thereon of an end portion of the optical fiber in a state in which the end portion of the optical fiber is guided in the front-to-rear direction. The body section 21A includes a control board that controls the heater, a power switch, an LED lamp, and the like. Moreover, as described later, the body section 21 includes a shaft housing portion 21B to house a shaft 41, a bush housing portion 21C to house a bush 45 supporting the shaft 41 and enabling sliding, and the like.

The main-body-side lid 23 is a lid member capable of opening and closing with respect to the body section 21. The main-body-side lid 23 includes the blade 23a and a fiber retainer 231. The fiber retainer 231 sandwiches the end portion of the optical fiber between itself and the placement section 211 of the body section 21, and is a location to retain the end portion of the optical fiber. When the main-body-side lid 23 is closed, the end portion of the optical fiber is pressed against the placement section 211 so as to be heated by the heater (not illustrated) provided in the placement section 211. Note that the main-body-side lid 23 may also be provided with a heat source (heater) to heat the coating of the optical fiber.

The gripping section 30 is a member that grips the optical fiber. In the present embodiment, the gripping section 30 grips the optical fiber by gripping the holder 7 retaining the optical fiber. However, configuration may be made such that the gripping section 30 grips the optical fiber indirectly through a member other than the holder 7, or grips the optical fiber directly. The gripping section 30 is configured so as to be capable of moving in the front-to-rear direction with respect to the main body 20 (see FIG. 2C). The gripping section 30 includes the gripping-side body 31 and the gripping-side lid 33.

The gripping-side body 31 is a member configuring a body of the gripping section 30. The gripping-side body 31 includes a holder housing part 311. The holder housing part 311 is a part where the holder 7 that retains the optical fiber is housed.

The gripping-side lid 33 is a lid member capable of opening and closing with respect to the gripping-side body 31. The gripping-side lid 33 includes a holder retainer 331. The holder retainer 331 sandwiches the holder 7 retaining the optical fiber between itself and the gripping-side body 31, and is a location to grip the holder 7. When the gripping-side lid 33 is closed, the holder 7 is pressed against the holder housing part 311, such that the holder 7 is gripped between the gripping-side body 31 and the gripping-side lid 33.

A slider 40 is a unit that connects the main body 20 and the gripping section 30 together so as to enable them to approach or separate from each other. The slider 40 includes shafts 41. The shaft 41 is a member that connects the main body 20 and the gripping section 30 together so as to enable them to approach or separate from each other. In the present embodiment, one end of the shaft 41 is fixed to the gripping section 30. When the gripping section 30 moves with respect to the main body 20, the shaft 41 also moves with respect to the main body 20. However, the shaft 41 may be fixed on the main body 20 side. Details of the configuration of the slider 40 and the shaft 41 are given later.

In order to remove the coating of the optical fiber, first, an operator opens the main-body-side lid 23 and the gripping-side lid 33 as illustrated in FIG. 2A, houses the holder 7 retaining the optical fiber (the optical fiber ribbon 1 in this case) in the holder housing part 311 of the gripping section 30, and places the end portion of the optical fiber on the placement section 211 of the body section 21. The optical fiber is thereby set in the coating removing device 10.

Note that, as illustrated in FIG. 2A, when the optical fiber is set in the coating removing device 10, the operator places the main body 20 and the gripping section 30 in a state of closest proximity to each other (a most proximal state). In the most proximal state, opposing faces of the main body 20 and the gripping section 30 are in contact with each other, and limited from getting any closer together than this. Namely, the mutually opposing faces of the main body 20 and the gripping section 30 have the function of stoppers to restrict the movement range of the main body 20 and the gripping section (or in other words the movement range of the shaft 41).

Next, as illustrated in FIG. 2B, the operator closes the main-body-side lid 23 and the gripping-side lid 33. Incisions are made in the coating of the optical fiber by the pair of blades 21A, 23A when the main-body-side lid 23 is closed. Moreover, when the main-body-side lid 23 is closed, the end portion of the optical fiber is sandwiched between the placement section 211 of the body section 21 and the fiber retainer 231 of the main-body-side lid 23, and the coating on the end portion of the optical fiber is heated by the heat source (heater) provided in the placement section 211. When the coating on the end portion of the optical fiber is heated, the coating softens, reducing adhesive force between the bare optical fiber 4 and the coating to achieve a state in which the coating is easy to remove.

Next, as illustrated in FIG. 2C, the operator moves the gripping section 30 rearward with respect to the main body 20 in a state in which the main-body-side lid 23 and the gripping-side lid 33 are closed. The main body 20 and the gripping section 30 are thereby separated from each other. The coating on the end portion of the optical fiber is thus pulled off by the pair of blades 21A, 23A, and the coating of the optical fiber is removed.

Note that, as illustrated in FIG. 2C, when removing the coating, the operator places the main body 20 and the gripping section 30 in a state separated to the maximum (a maximum separation state). The length of separation between the main body 20 and the gripping section 30 in the maximum separation state needs to be longer than the length of the coating to be removed from the end portion of the optical fiber. Therefore, in the present embodiment, the length of separation between the main body 20 and the gripping section 30 in the maximum separation state is longer than the front-to-rear direction length of the placement section 211, and longer than the length of optical fiber capable of being placed on the placement section 211 (the length of coating to be removed). This thereby enables the operator to remove the coating of the optical fiber placed on the placement section 211 by bringing the main body 20 and the gripping section 30 in the maximum separation state.

During removal of the coating of an optical fiber, as illustrated in FIG. 2C, if the separated main body 20 and gripping section 30 are caused to approach each other, there is a concern that the bare optical fiber 4 from which the coating has been removed might get bent between the main body 20 and the gripping section 30, and that the bare optical fiber 4 might be damaged. Thus, the slider 40 of the present embodiment includes a retention unit 50 to retain the main body 20 and the gripping section 30 in the maximum separation state (described later).

<Configuration of Slider 40 and Retention Unit 50>

Figure 3:
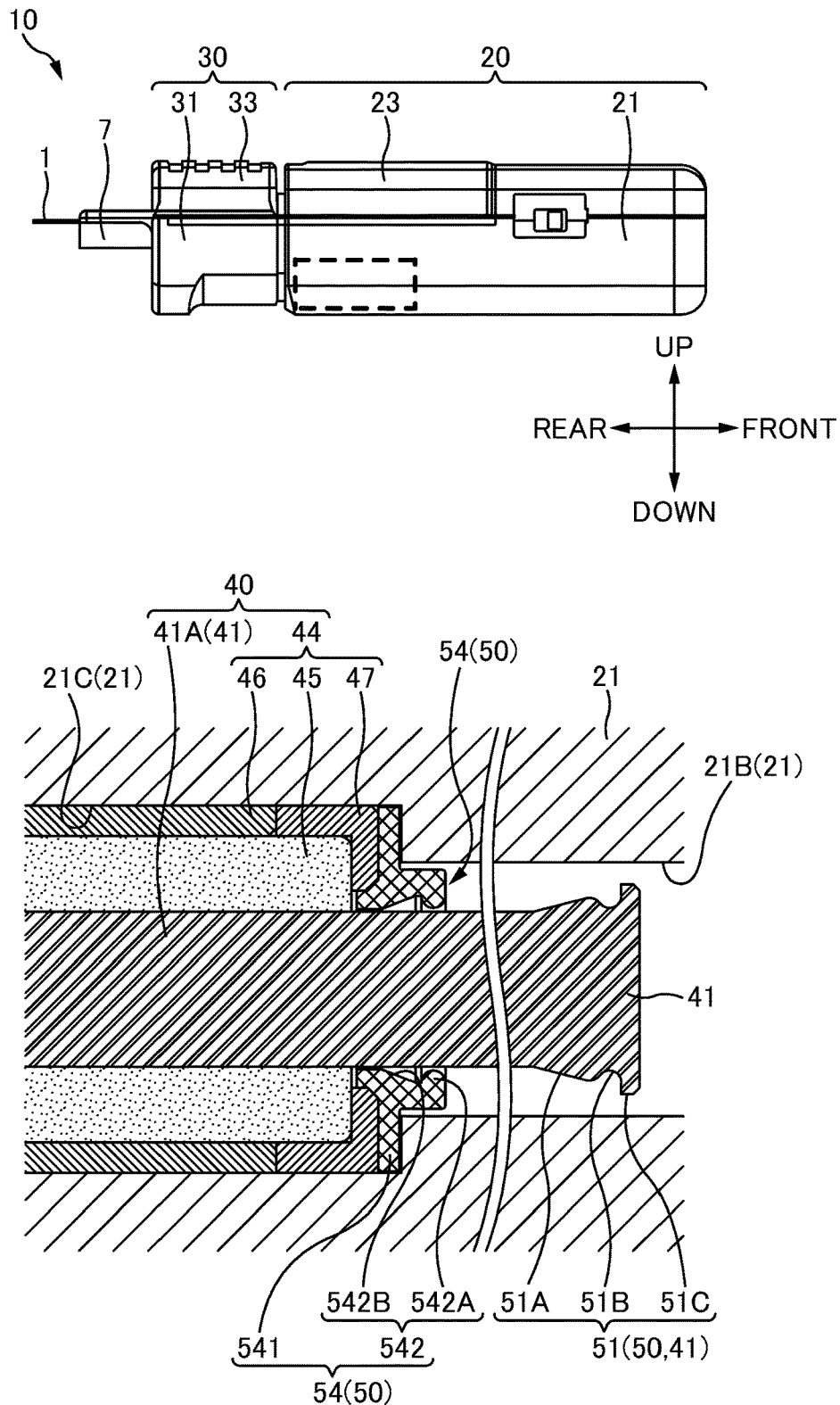
FIG. 3 is an explanatory diagram of a slider 40 and a retention unit 50 in a proximity state.
Figure 4:
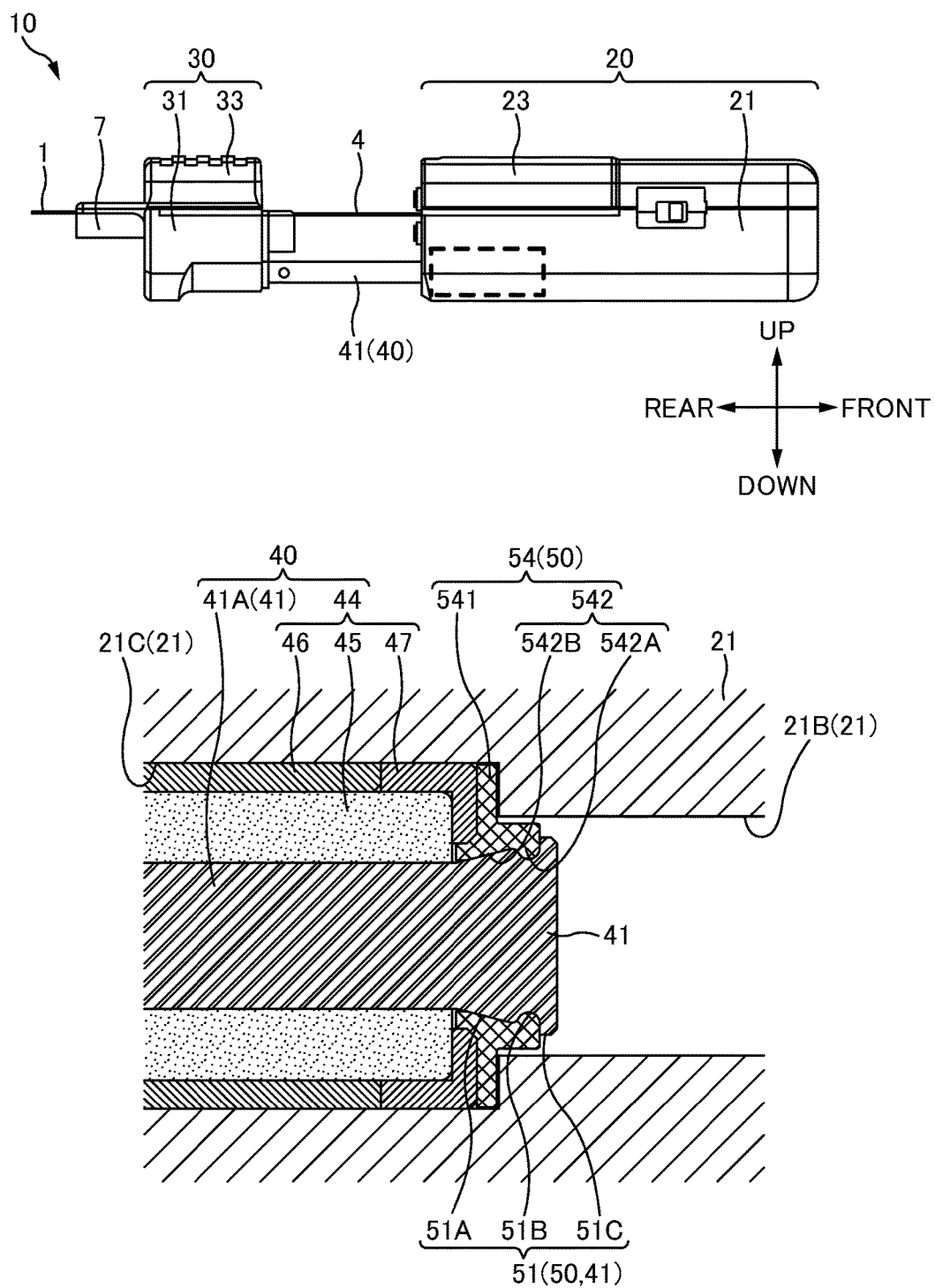
FIG. 4 is an explanatory diagram of a slider 40 and a retention unit 50 in a maximum separation state.

FIG. 3 is an explanatory diagram of the slider 40 and the retention unit 50 in a proximity state. FIG. 4 is an explanatory diagram of the slider 40 and the retention unit 50 in the maximum separation state. Note that at the bottom of the drawings in FIG. 3 and FIG. 4 there are cross-sections of the respective portions illustrated by broken lines at the top of the drawings in FIG. 3 and FIG. 4.

The slider 40 includes the shaft 41 and a sliding section 44. The sliding section 44 is a member that supports the shaft 41 and enables sliding. In the present embodiment, an end portion of the shaft 41 is fixed to the gripping section 30, and the sliding section 44 is provided in the main body 20. However, configuration may be made such that an end portion of the shaft 41 is fixed to the main body 20, and the sliding section 44 is provided in the gripping section 30. The shaft housing portion 21B and the bush housing portion 21C are provided on the side where the sliding section 44 is provided (the body section 21 side in the present embodiment). The shaft housing portion 21B is a space (housing space) that houses the shaft 41 so as to be capable of sliding, and is a space extending along the front-to-rear direction.

The bush housing portion 21C is a space (housing space) that houses the bush 45 and so on configuring the sliding section 44.

The sliding section 44 includes the bush 45, a bush holder 46, and a bush receiver 47. The bush 45 is a bearing part with internal linear bearing. The bush holder 46 is a member that retains the bush 45 in the bush housing portion 21C. The bush receiver 47 is a member interposed between the bush 45/the bush holder 46 and the main body 20. Note that in the present embodiment, the bush receiver 47 is a member that sandwiches a slide-side engagement portion 54 (described later) between itself and an inner wall face of the main body 20.

In the present embodiment, the sliding section 44 includes a ball bearing (not illustrated) as the linear bearing of the bush 45. This thereby reduces resistance when separating the main body 20 and the gripping section 30, and improves the slideability of the slider 40 as it slides the main body 20 and the gripping section 30. Note that the main body 20 and the gripping section 30, which have been separated during coating removal, are liable to approach each other when the slideability of the slider 40 has been raised. However, in the present embodiment, the bare optical fiber 4 (see FIG. 2C) is prevented from getting bent between the main body 20 and the gripping section 30 due to providing the retention unit 50, described later. It is particularly advantageous for the coating removing device 10 to include the retention unit 50 (described later) in cases in which the sliding section 44 includes a ball bearing as in this case.

The slider 40 of the present embodiment includes a retention unit 50. The retention unit 50 is a member that retains the main body 20 and the gripping section 30 in the maximum separation state (see FIG. 2C). In the present embodiment, the main body 20 and the gripping section 30 that have been separated can be suppressed from approaching each other by the retention unit 50 retaining the main body 20 and the gripping section 30 in the maximum separation state. In the present embodiment, the bare optical fiber 4 illustrated in FIG. 2C is thereby prevented from getting bent between the main body 20 and the gripping section 30.

The retention unit 50 includes the shaft-side engagement portion 51 and the slide-side engagement portion 54. The main body 20 and the gripping section 30 are retained in the maximum separation state by engagement (catching) of the shaft-side engagement portion 51 and the slide-side engagement portion 54. The shaft-side engagement portion 51 is provided on a terminal end portion of the shaft 41 (the end portion on opposite side to the fixed side thereof). The slide-side engagement portion 54 is provided on the side of whichever, of the main body 20 or the gripping section 30, the sliding section 44 is provided on (this being the main body 20 in the present embodiment).

Figure 5:
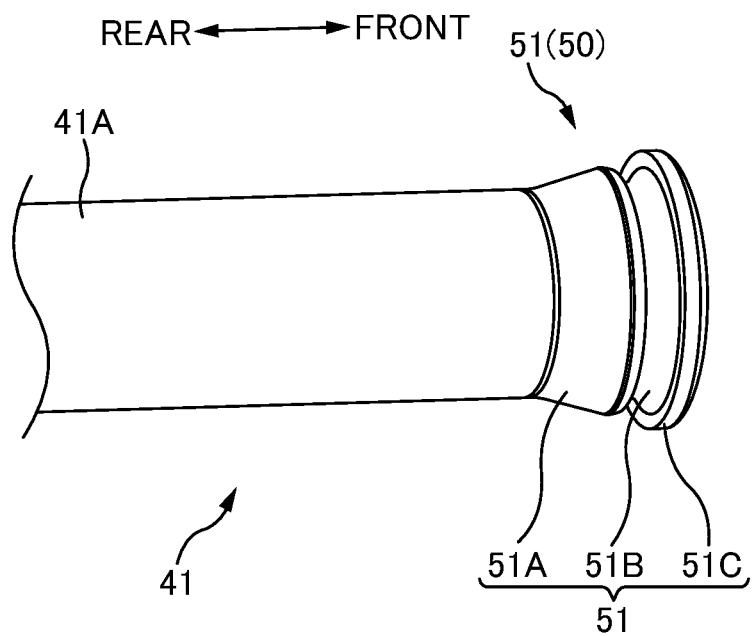
FIG. 5 is a perspective view of a shaft-side engagement portion 51.

FIG. 5 is a perspective view of the shaft-side engagement portion 51.

The shaft-side engagement portion 51 is a location that configures the retention unit 50 on the shaft 41 side and that engages with the slide-side engagement portion 54. The shaft-side engagement portion 51 includes a taper 51A, an indentation 51B, and a flange 51C.

The taper 51A is a location that gradually becomes thicker toward the terminal end portion of the shaft 41. The slide-side engagement portion 54 can be gradually elastically deformed due to the shaft-side engagement portion 51 including the taper 51A, thereby facilitating engagement of the shaft-side engagement portion 51 and the slide-side engagement portion 54. The taper 51A is a location that projects out toward the outside more than the shaft portion 41A.

The indentation 51B is a location with an indented groove shape. The indentation 51B is a location that a protrusion 542A of the slide-side engagement portion 54 catches on (see also FIG. 4), and is provided further to the terminal end portion side than the taper 51A. The main body 20 and the gripping section 30 are retained in the maximum separation state by the protrusion 542A of the slide-side engagement portion 54 catching on the indentation 51B. Note that the diameter of the indentation 51B is thicker than the diameter of the shaft portion 41A of the shaft 41. The protrusion 542A of the slide-side engagement portion 54 accordingly engages with the indentation 51B, whereas the protrusion 542A does not engage with the shaft portion 41A, thereby enabling wear on the protrusion 542A to be suppressed.

The flange 51C is a location formed at the terminal end portion of the shaft 41, and is the thickest location on the shaft 41. The flange 51C has a diameter of a size not capable of passing through the slide-side engagement portion 54. Due to a flange face of the flange 51C contacting an end face of the slide-side engagement portion 54, further movement of the shaft 41 is limited. Namely, the flange 51C has the function of a stopper to restrict the movement range of the shaft 41. In other words, the flange 51C has the function of a stopper to restrict the maximum separation position of the main body 20 and the gripping section 30.

Figure 6:
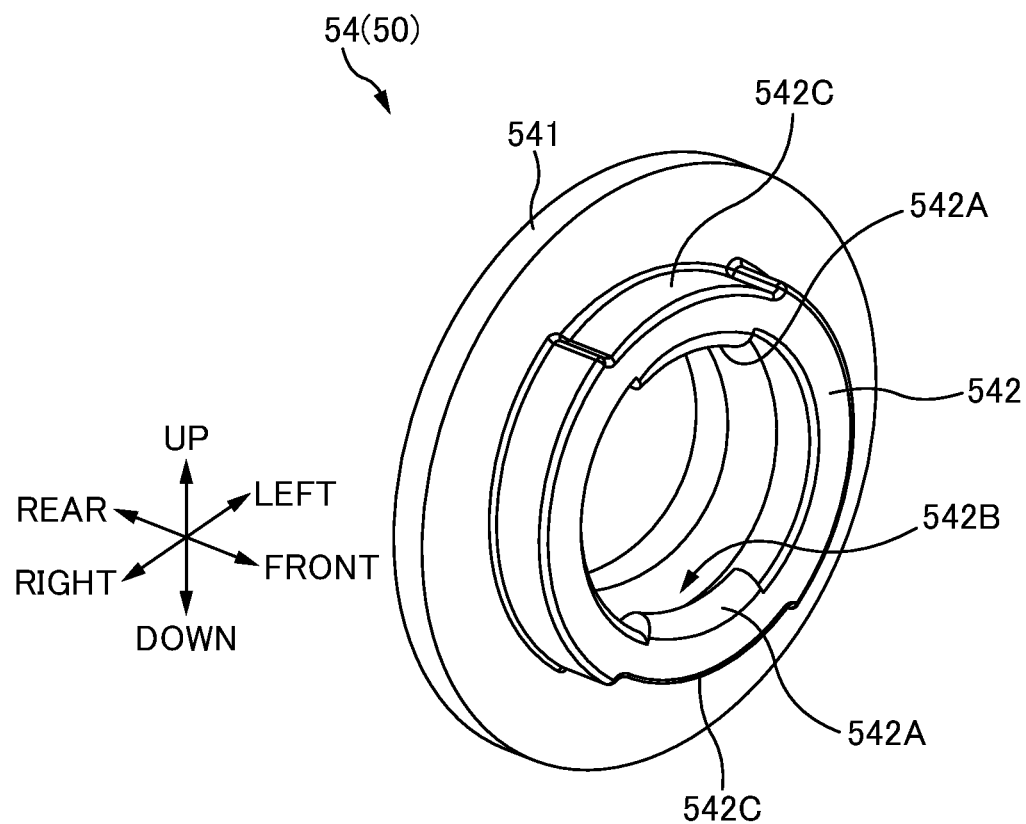
FIG. 6 is a perspective view of a slide-side engagement portion 54.

FIG. 6 is a perspective view of the slide-side engagement portion 54.

The slide-side engagement portion 54 is a location configuring the retention unit 50 on the sliding section 44 side, and is a location that engages with the shaft-side engagement portion 51. The shaft-side engagement portion 51 is configured by an elastically deformable member. In this case the shaft-side engagement portion 51 is made of rubber; however, the engagement portion 51 may be made of an elastically deformable metal. The slide-side engagement portion 54 includes a flange 541 and a circular cylinder 542.

The flange 541 is a flange shaped location formed to the slide-side engagement portion 54, and is a location to fix the slide-side engagement portion 54 to the main body 20. Specifically, as illustrated in FIG. 4, the slide-side engagement portion 54 is fixed to the main body 20 (see also FIG. 4) by the flange 541 being sandwiched between the inner wall face of the main body 20 (the stepped face of the shaft housing portion 21B and the bush housing portion 21C) and an end face of the bush receiver 47.

The circular cylinder 542 is a circular cylinder shaped location to insert the shaft 41 through. The protrusion 542A and a taper housing 542B are formed on the inner face of the circular cylinder 542. A thin walled portion 542C is formed on an outer face of the circular cylinder 542.

The protrusion 542A is a location projecting out to the inside from the inner wall face of the circular cylinder 542, and is a location that catches on the indentation 51B of the shaft-side engagement portion 51 (see also FIG. 4). The protrusion 542A is placed at an edge (the front edge) of the circular cylinder 542, and the circular cylinder 542 is accordingly configured to readily elastically deform such that the protrusion 542A widens toward the outside. The internal diameter of the protrusion 542A is configured larger than the shaft portion 41A of the shaft 41. This thereby enables wear on the protrusion 542A to be suppressed. The internal diameter of the protrusion 542A is smaller than the thickest portion of the taper 51A of the shaft 41. Thus, the protrusion 542A makes contact with the taper 51A when the taper 51A of the shaft 41 passes through the circular cylinder 542 of the slide-side engagement portion 54, with the circular cylinder 542 gradually elastically deforming such that the protrusion 542A widens toward the outside. Because the protrusion 542A is configured so as to be gradually deformed elastically by the taper 51A, the protrusion 542A is less likely to detach from the indentation 51B once the protrusion 542A has caught on the indentation 51B.

In the present embodiment, the protrusion 542A projects toward the inside from a portion on the inside face of the circular cylinder 542. This thereby enables the circular cylinder 542 to more readily elastically deform such that the protrusion 542A widens toward the outside, compared to cases in which a protrusion is configured so as to project toward the inside around the entire circumference.

The taper housing 542B is a location indented from the inner wall face of the circular cylinder 542, and is a space (housing space) to house the taper 51A of the shaft-side engagement portion 51. In other words, the taper housing 542B is a location that engages with the taper 51A projecting out from the shaft portion 41A of the shaft 41 towards the outside (see FIG. 4). Thus, by forming an indentation and a protrusion (the indentation 51B and the taper 51A) to the shaft-side engagement portion 51 and by forming an indentation and a protrusion (the protrusion 542A and the taper housing 542B) to the slide-side engagement portion 54, engagement force is strengthened by the engaging of the indentations and the protrusions of the shaft-side engagement portion 51 and the slide-side engagement portion 54 with each other, enabling the force retaining the main body 20 and the gripping section 30 in the maximum separation state to be strengthened.

The thin walled portion 542C is a location indented from the outer circumferential face of the circular cylinder 542, and is a location where the wall thickness of the circular cylinder 542 is thinned. The thin walled portion 542C is formed at the rear side of the location where the protrusion 542A is formed. Due to forming the thin walled portion 542C at the rear side of the protrusion 542A, the circular cylinder 542 readily elastically deforms such that the protrusion 542A widens toward the outside, facilitating passage of the taper 51A of the shaft 41 through inside the protrusion 542A.

As illustrated in FIG. 2C, when the main body 20 and the gripping section 30 of the coating removing device 10 have been separated, just prior to the maximum separation state, the taper 51A of the shaft-side engagement portion 51 enters inside the protrusion 542A of the slide-side engagement portion 54, the taper 51A and the protrusion 542A make contact with each other, and the circular cylinder 542 gradually elastically deforms such that protrusion 542A widens toward the outside. When this occurs, due to the taper 51A being configured so as to gradually thicken, there is merely a gradual change in the resistance to separating the main body 20 and the gripping section 30, and a sudden jump in separation resistance can be avoided. When the main body 20 and the gripping section 30 are separated further and the main body 20 and the gripping section 30 adopt the maximum separation state, as illustrated in FIG. 4, the main body 20 and the gripping section 30 are retained in the maximum separation state by the protrusion 542A of the slide-side engagement portion 54 catching on the indentation 51B of the shaft-side engagement portion 51 (by engagement of the shaft-side engagement portion 51 and the slide-side engagement portion 54).

After the coating of the optical fiber has been removed as illustrated in FIG. 2C, the operator opens the gripping-side lid 33 and takes out the holder 7 retaining the optical fiber. Due to the main body 20 and the gripping section 30 being retained in the maximum separation state by the retention unit 50, the separated main body 20 and gripping section 30 can be suppressed from approaching each other during operation to open the gripping-side lid 33 and remove the holder 7, enabling the bare optical fiber 4 to be prevented from getting bent between the main body 20 and the gripping section 30.

After opening the gripping-side lid 33 and taking out the holder 7, the operator releases the retention of the maximum separation state by the retention unit 50 and causes the main body 20 and the gripping section 30 to approach each other. In order to release the retention of the maximum separation state by the retention unit 50 in the present embodiment, a force exceeding the weight of the gripping section 30 needs to be applied in a direction to cause the main body 20 and the gripping section 30 to approach each other. In other words, from a state in which the protrusion 542A is caught in the indentation 51B, in order to remove the protrusion 542A from the indentation 51B, a force exceeding the weight of the gripping section 30 needs to be applied in the direction to cause the main body 20 and the gripping section 30 to approach each other. Namely, the retention unit 50 is configured such that retention of the maximum separation state by the retention unit 50 is not released unless a force exceeding the weight of the gripping section 30 is applied. Setting the retention force of the retention unit 50 in this manner enables the maximum separation state of the main body 20 and the gripping section 30 to be retained by the retention unit 50, even supposing the coating removing device 10 were to be tilted prior to removing the optical fiber from the coating removing device 10. The main body 20 and the gripping section 30 that have been separated can accordingly be suppressed from inadvertently approaching each other.

Figure 7:
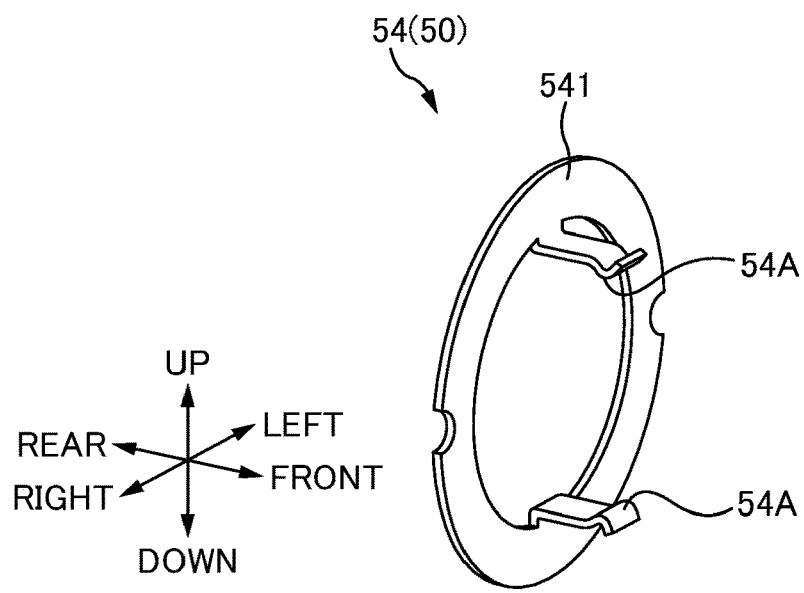
FIG. 7 is a perspective view of a slide-side engagement portion 54 of a second embodiment.

Second Embodiment:

FIG. 7 is a perspective view of a slide-side engagement portion 54 of a second embodiment. The slide-side engagement portion 54 of the first embodiment is made of rubber; however, the slide-side engagement portion 54 of the second embodiment is made of metal. Thus, the material of the slide-side engagement portion 54 is not limited to rubber, and may be any material that is elastically deformable.

The slide-side engagement portion 54 of the second embodiment includes a protrusion 54A that engages with an indentation 51B of a shaft-side engagement portion 51. The protrusion 54A, similarly to in the protrusion 542A of the first embodiment, elastically displaces so as to widen toward the outside on contact with the taper 51A. The protrusion 54A then engages with the indentation 51B of the shaft-side engagement portion 51. In the second embodiment, the maximum separation state of the main body 20 and the gripping section 30 is retained by engagement of the shaft-side engagement portion 51 and the slide-side engagement portion 54.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1: Optical fiber ribbon; 4: Bare optical fiber;
7: Holder; 10: Coating removing device;

20: Body; 21: Body section;
21A: Blade; 21B: Shaft housing portion;
21C: Bush housing portion; 211: Placement section (heater);
23: Main-body-side lid; 23A: Blade; 231: Fiber retainer;
30: Gripping section; 31: Gripping-side body; 311: Holder housing part;
33: Gripping-side lid; 331: Holder retainer;
40: Slider; 41: Shaft; 41A: Shaft portion;
44: Sliding section; 45: Bush (bearing part);
46: Bush holder; 47: Bush receiver;
50: Retention unit; 51: Shaft-side engagement portion;
51A: Taper; 51B: Indentation; 51C: Flange;
54: Slide-side engagement portion; 541: Flange;
542: Circular cylinder; 542A: Protrusion;
542B: Taper housing; 542C: Thin walled portion;
54A: Protrusion (second embodiment).

The invention claimed is:

1. A coating removing device comprising:
a main body that includes a blade that removes the coating; a gripping section that grips an optical fiber; and
a slider that connects said the main body and said the gripping section together, wherein the main body and the gripping section approach or separate from each other on the slider, said the coating removing device removes the coating from said the optical fiber by separating said the main body and said the gripping section after an incision is made in said the coating of said the optical fiber using said the blade, said the slider includes a retention unit to retain said the main body and said the gripping section in a maximum separation state, the slider comprises a shaft,
an end portion of the shaft is fixed to one of the main body or the gripping section, the other of the main body or the gripping section includes a sliding section in which the shaft slides,
the retention unit comprises:
a shaft-side engagement portion that is disposed on an end portion of the shaft opposite to the fixed end portion of the shaft, and comprises a taper that becomes thicker toward the end portion of the shaft and an indentation; and
a slide-side engagement portion that comprises a protrusion that engages with the indentation of the shaft-side engagement portion and retains the maximum separation state, wherein the slide-side engagement portion is elastic and deforms when the taper engages with the slide-side engagement portion.

2. The coating removing device according to claim 1, wherein
retention of the maximum separation state by the retention unit is released when force exceeding weight of the gripping section is applied in a direction to cause the main body and the gripping section to approach each other.

3. The coating removing device according to claim 1, wherein
the slide-side engagement portion comprises a circular cylinder through which the shaft is inserted,
the protrusion projects from an inner surface of a sidewall of the circular cylinder toward an inside of the circular cylinder, and
a thin walled portion is formed in an outer surface of the sidewall at an outer position on the outer surface corresponding to an inner position on the inner surface where the protrusion is disposed.

4. The coating removing device according to claim 1, wherein
the indentation is provided further toward the end portion of the shaft than the taper, and
the slide-side engagement portion further includes:
a taper housing that houses the taper.

5. The coating removing device according to claim 1, wherein the sliding section includes a ball bearing that slidably supports the shaft.

6. The coating removing device according to claim 1, wherein
the main body includes a placement section on which the optical fiber is placed, and
a length of separation between the main body and the gripping section in the maximum separation state is longer than a length of the optical fiber.

* * * * *